United States Patent
Ogawa et al.

(10) Patent No.: US 6,587,278 B1
(45) Date of Patent: Jul. 1, 2003

(54) OPTICAL INTERFEROMETER AND SIGNAL SYNTHESIZER USING THE INTERFEROMETER

(75) Inventors: Susumu Ogawa, Hiki-gun (JP); Hrvoje Petek, Iruma-gun (JP); Hisashi Nagano, Hiki-gun (JP); Albert Heberle, Kokubunji (JP); Tatsuya Tomaru, Hiki-gun (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/524,549

(22) Filed: Mar. 13, 2000

Related U.S. Application Data

(63) Continuation of application No. 08/997,700, filed on Dec. 23, 1997.

(30) Foreign Application Priority Data

Dec. 26, 1996 (JP) ............................................. 8-347140
Jan. 24, 1997 (JP) ............................................. 9-011514

(51) Int. Cl.$^7$ ............................................. G02B 27/14
(52) U.S. Cl. ....................................................... 359/629
(58) Field of Search ................................. 359/629, 634

(56) References Cited

U.S. PATENT DOCUMENTS

| | | |
|---|---|---|
| 5,293,213 A | 3/1994 | Klein et al. |
| 5,323,229 A | 6/1994 | May et al. |
| 5,689,361 A | 11/1997 | Damen et al. |
| 5,719,650 A * | 2/1998 | Wefers et al. ................. 349/74 |

FOREIGN PATENT DOCUMENTS

| | | |
|---|---|---|
| GB | 2 147 695 | 5/1985 |
| JP | 63-028088 | 2/1988 |
| JP | 6-281426 | 10/1994 |
| WO | WO 94/05967 | 3/1994 |

OTHER PUBLICATIONS

"Optical Micromachines", M. Esashi, Oyobuturi (Japanese Society of Applied Physics), vol. 66, No. 1 (1997), pp. 9–14.
"High–Resolution Femtosecond Pulse Shaping", A. M. Weiner, et al, J. Opt. Soc. Am. B, vol. 5, No. 8, Aug. 1988, pp. 1563–1572.
Multifrequency Laser Dense WDM Application, M. Zirngibl, European Conference on Integrated Optics, 1997, pp. 254–259.

* cited by examiner

*Primary Examiner*—Frank G. Font
*Assistant Examiner*—Andrew H. Lee
(74) *Attorney, Agent, or Firm*—Antonelli, Terry, Stout & Kraus, LLP

(57) ABSTRACT

An optical signal synthesizer having an optical slab waveguide constructed from three layers in which optical pulses are introduced. A first cut-away portion of the optical slab waveguide has a plano-concave shape serving as a plano-convex lens which collimates the introduced optical pulses, a second cut-away portion of the optical slab waveguide serving as a diffraction grating for parallel light beams in which the optical pulses are separated into every frequency, and a third cut-away portion of the optical slab waveguide has a plano-concave shape serving as a plano-convex lens by which the separated optical pulses are focused on a different spatial position associated with each frequency. A spatial light modulator is fabricated at the focusing position in the optical slab waveguide which allows the optical pulses subjected to optical modulation every frequency to pass therethrough according to an applied electrical signal. A fourth cut-away portion of the optical slab waveguide has a plano-concave shape serving as a plano-convex lens which collimates each modulated optical frequency component individually, and a fifth cut-away portion of the optical slab waveguide serving as a diffraction grating for the modulated optical pulses restores the modulated optical pulses to the parallel light beams.

5 Claims, 7 Drawing Sheets

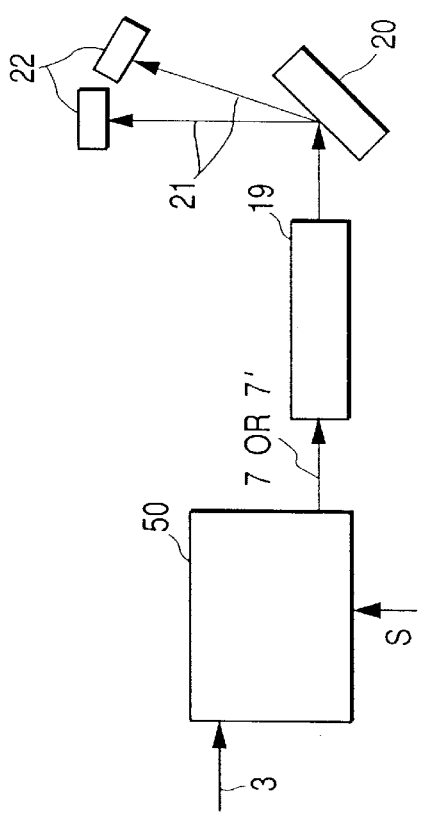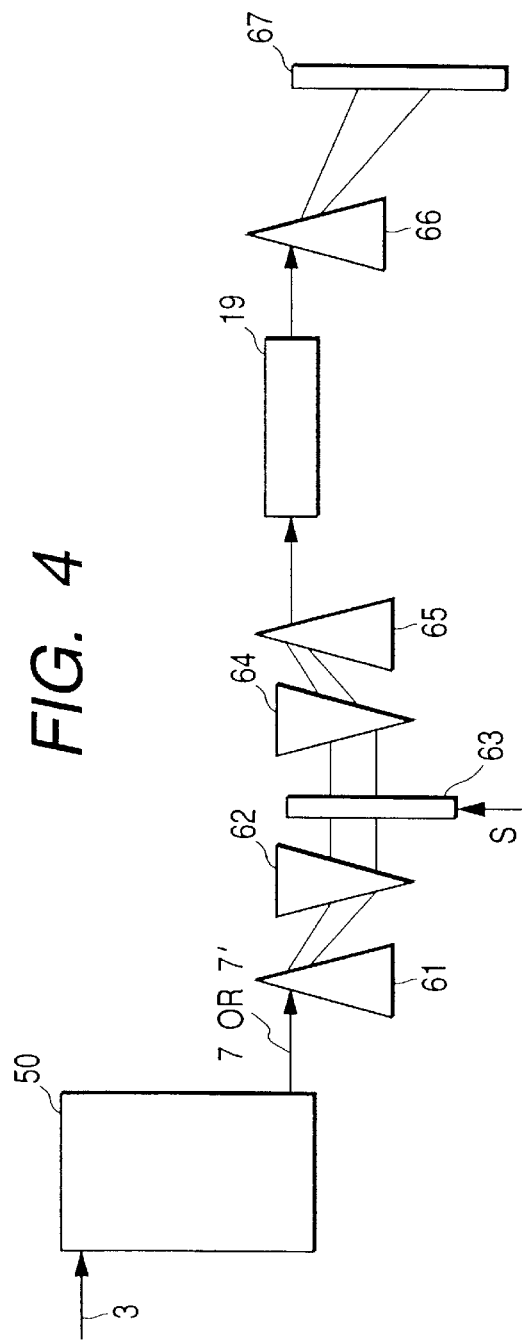

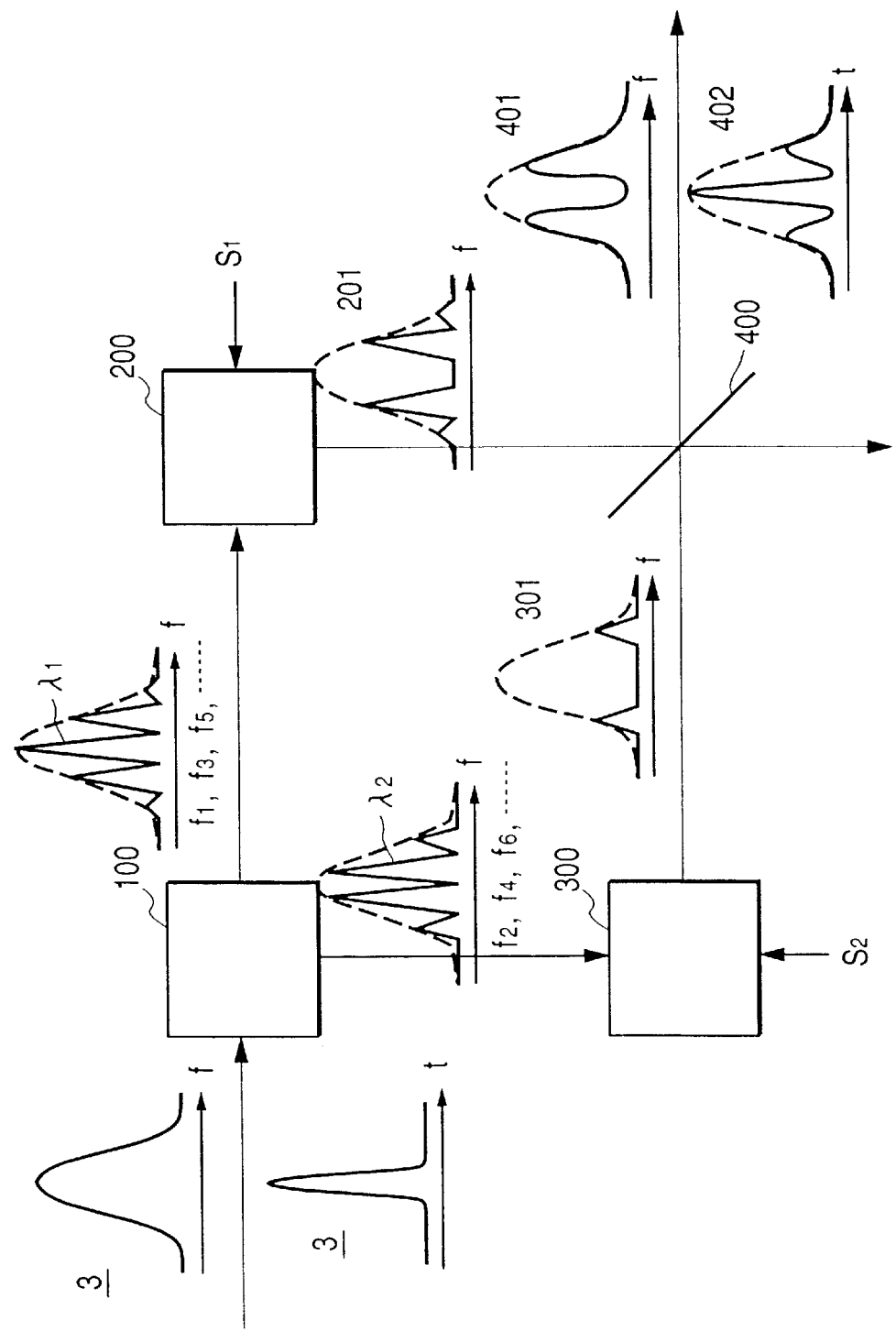

OPTICAL INTERFEROMETER AND SIGNAL SYNTHESIZER USING THE INTERFEROMETER

CROSS REFERENCE TO RELATED APPLICATION

This is a continuation of U.S. application Ser. No. 08/997,700, filed Dec. 23, 1997, the subject matter of which is incorporated by reference herein.

BACKGROUND OF THE INVENTION

1. Field of the Invention

This invention relates to an optical interferometer and a signal synthesizer, and particularly to an optical interferometer applied to an optoelectronic device for performing signal processes for operations or communications, which are employing optical pulses and a signal synthesizer using the optical interferometer.

2. Description of the Related Art

On/off switching of output optical pulses using the difference in phase between two optical paths of a Mach-Zehnder interferometer is a well-known technique. However, since a long pulse of sub-nanoseconds or so has heretofore been used, the spectrum of the pulse is very narrow. Further, the conventional Mach-Zehnder interferometer controls the intensities of the output optical pulses but encounters difficulties in controlling their spectra.

SUMMARY OF THE INVENTION

The prior art has a problem in that although it performs intensity modulation on the output optical pulses with respect to relatively long pulse of sub-nanoseconds or so, the control of the spectra of the output optical pulses or the effective synthesis of signals by decompositing the spectrum and controlling each spectral component has not yet been taken into consideration.

An object of the present invention is to provide an optical interferometer capable of allowing control of spectra, control of output optical pulses by utilizing a controlled stable interferometer and a femtosecond pulse having a wide bandwidth in combination, and a signal synthesizer using the optical interferometer, and a signal transmission method.

Typical examples of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a diagram depicting an example of a configuration of a communication device according to one embodiment in which a phase-locked interferometer according to the present invention is used as a signal synthesizer;

FIG. 4 is a diagram showing an example of a configuration of a communication device according to another embodiment in which a phase-locked interferometer according to the present invention is used as a signal synthesizer;

FIG. 5 is a diagram illustrating a further embodiment in which a phase-locked interferometer according to the present invention is used as a signal synthesizer;

DETAILED DESCRIPTION OF THE PREFERRED EMBODIMENTS

In order to achieve the above object, an optical path control means for stably controlling an optical path difference between divided optical pulses is provided in the present invention. Stable output optical pulses are obtained by holding the optical path difference in a predetermined relationship and respective spectra of the resultant output optical pulses are controlled by modulating signals, thereby making it possible to synthesize signals for optical communications. It is thus possible to perform multiplexed optical communications.

A femtosecond pulse, which is incident to a Mach-Zehnder interferometer, is separated into two optical paths, followed by re-synthesis, which in turn is outputted as two complementary output pulses. The commonly used interferometer cannot obtain output pulses stabilized in the phase domain due to fluctuations of the optical path difference developed within the interferometer. As one method according to the present invention, a monochrometer is provided which monitors fluctuations of an optical path difference developed in the interferometer, based on one of two output optical pulses produced from the interferometer to thereby effect feedback on the optical path difference in the interferometer, thus providing stabilization in the phase domain.

As another method according to the present invention an interferometer is provided which makes up of a semiconductor and strict temperature control is performed to stabilize the fluctuations in the phase domain. If further necessary, then feedback for adjusting the length of the optical path is effected on one optical path to compensate for the fluctuations of the optical path difference as well as for the temperature control.

When femtosecond pulses each having a wide spectrum are launched into the interferometer stabilized in the phased domain in this way, they interfere differently at each wavelengths. It is therefore possible to control the spectrum of each output optical pulse and bear or load a larger quantity of information on one pulse.

According to the present invention, the two optical-path interferometer, for example, the Mach-Zehnder interferometer is capable of controlling the optical path difference in a resolution of ½₀ or less of the central wavelength of the input optical pulse, i.e., sub-femtoseconds if described by time. As a result, the spectrum of each pulse outputted from the interferometer with respect to the input femtosecond pulse can be stably controlled.

Preferred embodiments of the present invention will hereinafter be described specifically with reference to the accompanying drawings.

[EMBODIMENT I]

Figure 1A:
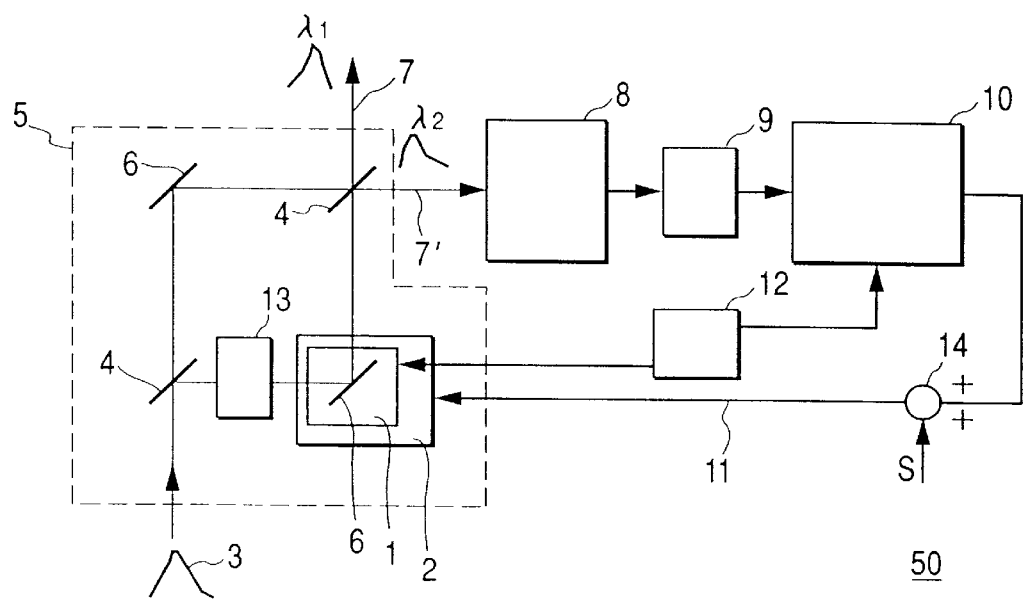
FIG. 1A is a block diagram showing one embodiment of a phase-locked interferometer according to the present invention.

FIG. 1A is a block diagram of one embodiment of a phase-locked interferometer according to the present invention. The present embodiment illustrates a phase-locked interferometer 50 which comprises a two optical-path interferometer 5 and a device for performing feedback to monitor fluctuations of an optical path difference developed in the interferometer and compensate for the fluctuations.

The two optical-path interferometer 5 comprises two optical paths 7 and 7' formed by a beam splitter 4, mirrors 6 and a beam splitter 4. One optical path 7' is nothing but the configuration of a simple optical path. In the other optical path 7, the mirror 6 is mounted to a piezo electrically actuated optical stage 1 which vibrates with a frequency of a few thousand hertz and with an amplitude of about ¼₀ the wavelength of an input optical pulse. Further, the piezo electrically actuated optical stage 1 is mounted to a piezo electrically actuated optical stage for compensation 2. The piezo-controlled optical stage 2 fine-adjusts the position of the mirror 6 according to a position control signal to be described later to thereby adjust or control its optical path length. Further, a motor controlled optical stage 13 for rough-adjusting the optical path length is interposed in the optical path 7. A predetermined interference status in the initial state of the interferometer can be created under the control of the motor controlled optical stage 13.

Incidentally, the optical stages 1, 2 and 13 for controlling the optical path length are provided within the optical path 7 in FIG. 1A. It is however needless to say that the optical stages 1 and 2 may be provided within the optical path 7 and the optical stage 13 may be provided within the optical path 7' and that the optical stages 1 and 2 can be in the optical paths 7' and 7', respectively.

Figure 1B:
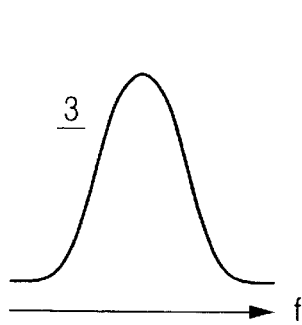
FIG. 1B is a diagram for describing a spectrum of an optical pulse inputted to the phase-locked interferometer shown in FIG. 1A.
Figure 1C:
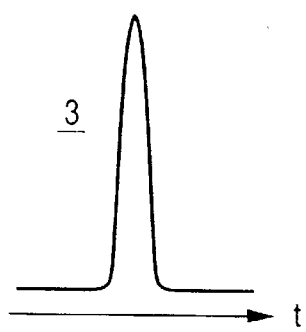
FIG. 1C is a diagram for describing a time characteristic of the input optical pulse.

As an optical pulse source inputted to the two optical-path interferometer 5, a femtosecond titanium sapphire laser pumped by an argon laser was used. The width of a pulse outputted from the laser is 10 fs. The present laser pulse is allowed to pass through a β-$B_aB_2O_4$ (BBO) crystal to thereby generate second harmonics (whose wavelength ranges from 370 nm to 410 nm) (pulse width ranging from 12 fs to 15 fs). Thereafter, a pulse 3 compressed through a prism pair was obtained. Examples of a spectrum characteristic of the input pulse or optical pulse 3 and a time characteristic thereof are illustrated in FIGS. 1B and 1C respectively.

When the input optical pulse 3 is launched into the Mach-Zehnder interferometer 5 having the beam splatters 4 and the mirrors 6, interference occurs according to the difference between the optical paths in the interferometer 5, so that output optical pulses having complementary spectra $\lambda_1$ and $\lambda_2$ can be obtained from the optical paths 7 and 7'. The phase of output of the optical paths 7 and 7' differs by Π(½ of an optical cycle). The output optical pulse $\lambda_2$ obtained from one 7' of the two optical paths 7 and 7' in the interferometer is allowed to pass through a spectroscope (e.g., diffraction grating) 8 and the intensity of a predetermined wavelength within the spectrum FIG. 1B is measured by an photo-detector 9. When the difference between the optical path lengths of the interferometer 5 fluctuates, the intensity of the output produced from the spectroscope 8 varies and hence the output of the photo-detector 9 varies. It is thus possible to monitor fluctuations of the optical path difference of the interferometer 5. The piezo-controlled optical stage 1 is vibrated by an oscillator 12 and it is possible to obtain a component synchronized with the vibration of the optical intensity output of the photo-detector 9 from a lock-in amplifier 10. The lock-in amplifier 10 detects a variation in the optical path difference from a variation in the output of the photodetector 9 and compensates for the detected variation, and outputs a compensation signal 11 to the optical stage 2 so as to hold the optical path difference constant. It was thus possible to control the interferometer so as to always hold the spectrum of the optical pulse 7 outputted from the interferometer constant. Since the piezo-controlled optical stage 1 is vibrated by the oscillator 12, the present embodiment can offer high sensitivity to the change in the optical path difference.

Although omitted in the aforementioned description, reference numeral 14 in FIG. 1A indicates one example of a portion for inputting a modulating signal. This portion corresponds to an addition circuit which adds a signal S to the output of the lock-in amplifier 10. Thus, when the signal S is added to the output of the lock-in amplifier 10, an error would be as if to have occurred in the optical path difference by its addition. For example, the difference between the two optical paths 7 and 7' is reversed so that the output optical pulses of spectra $\lambda_2$ and $\lambda_1$ are obtained from the optical paths 7 and 7' respectively. Namely, the addition circuit results in one necessary when the interferometer is used as a signal synthesizer by controlling the optical path difference of the interferometer 5 shown as the embodiment. This will be described later.

FIGS. 2A through 2D are respectively diagrams illustrating examples of spectra of the optical pulses inputted to the phase-locked interferometer 50 shown in FIG. 1A and spectra of output optical pulses.

Figure 2A:
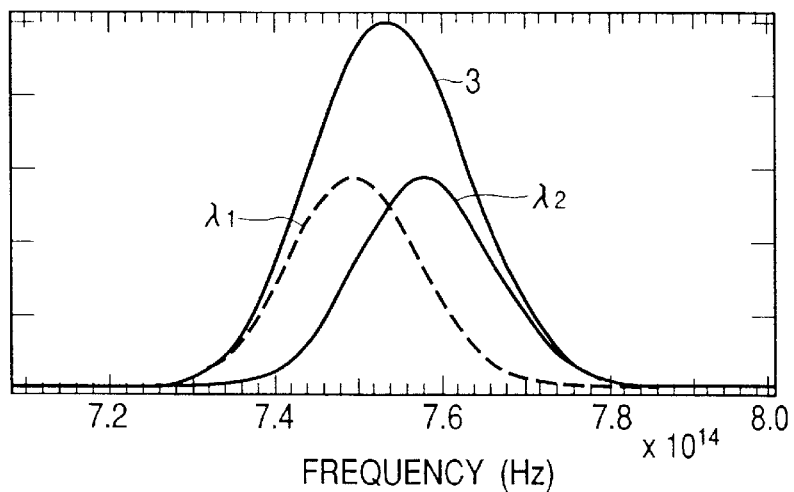
FIGS. 2A through 2D are respectively diagrams illustrating examples of spectra of the optical pulse inputted to the phase-locked interferometer shown in FIG. 1A and spectra of output optical pulses.
Figure 2B:
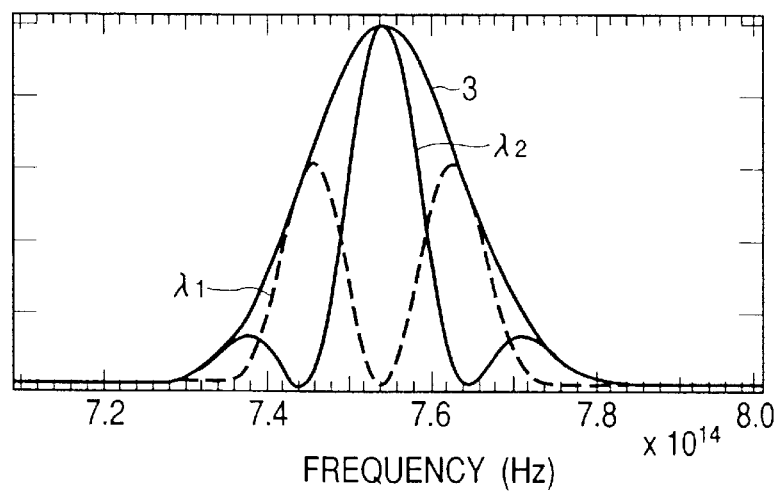
Figure 2C:
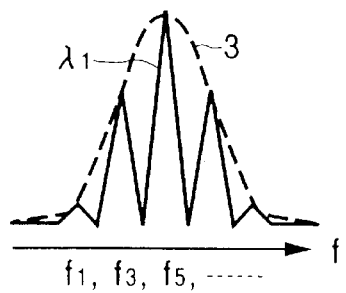
Figure 2D:
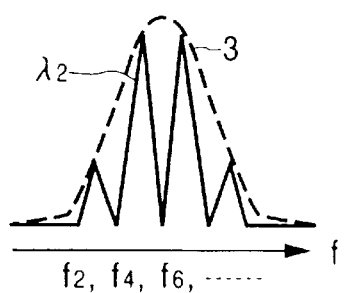

Referring to FIG. 2A, a thick solid line 3 indicates the spectrum of an incident pulse. Symbols $\lambda_1$ and $\lambda_2$ respectively indicate output spectra at the time that the phase of the optical path difference of the interferometer is 2 nΠ and 2 nΠ+Π (where n is an arbitrary integer but indicates n=36 in FIG. 2A) where the frequency detected by the spectroscope 8 is slightly shifted from the central frequency ($7.544 \times 10^{14}$ Hz) of the incident pulse. Referring to FIG. 2B, a thick sold line 3 indicates the spectrum of an incident pulse. Symbols $\lambda_1$ and $\lambda_2$ respectively indicate output spectra at the time that the phase of the optical path difference of the interferometer is 2nΠ and 2 nΠ +n (where n=36) where the detected frequency of the spectroscope 8 is set to the central frequency ($7.544 \times 10^{14}$ Hz) of the incident pulse. Even if the phase of the optical path difference of the interferometer is set to 2 nΠ+Π/2 and 2 nΠ−Π/2 (where n=36) where the detected frequency of the spectroscope 8 is set to the central frequency ($7.544 \times 10^{14}$ Hz) of the incident pulse, output spectra similar to those shown in FIG. 2A can be obtained. FIGS. 2C and 2D respectively show the states of two pulses in the interferometer 5 at the time that the difference in time between the two pulses is rendered larger (greater than n=36). The number of peaks of the frequency in the output spectrum can be arbitrarily set by setting n on an arbitrary basis.

[EMBODIMENT II]

FIG. 3 is a block diagram showing a signal synthesizer for controlling pulses $\lambda_1$ and $\lambda_2$ outputted from a phase-locked interferometer 50 according to 1/0 of a modulating signal S and an example in which communications are made by the signal synthesizer.

As described in relation to FIG. 1A, when a voltage having a suitable magnitude is applied to the addition circuit 14 in response to 1/0 of the modulating signal S, the error would be as if to have occurred in the optical path difference correspondingly. For example, the difference between the two optical-paths 7 an 7' is reversed so that output optical pulses having spectra $\lambda_1$ and $\lambda_2$ can be obtained from their corresponding optical paths 7 and 7'. Namely, the phase-locked interferometer can be constructed as the signal synthesizer by controlling the optical path difference of the interferometer 5. An incident pulse 3 is supplied to the phase-locked interferometer 50 and a signal corresponding to a signal to be transmitted is applied to the phase-locked interferometer 50. The spectrum of the output optical pulse produced from the interferometer 50 according to the signal S results in $\lambda_1$ or $\lambda_2$. Namely, it is possible to generate a signal corresponding to an output optical pulse of a spectrum $\lambda_1$ or $\lambda_2$ corresponding to 0 or 1 of the signal S. In this case, either one of the optical paths 7 and 7' may be used. This signal pulse is allowed to pass through an optical transmission or transfer medium 19 so as to be transmitted to signal receiving points. Signals at receiving points are detected as follows: Optical pulses 21 diffracted to different positions according to the wavelength by a diffraction grating 20 are detected by their corresponding photo-detectors 22 to thereby make it possible to determine the signal of 0 or 1. Although the atmosphere can be used as the optical transfer medium 19, a wave-guiding channel or waveguide, or optical fiber may be used.

[EMBODIMENT III]

In the present embodiment, an output spectrum obtained from an optical path 7 or 7' of a phase-locked interferometer 50 is set so as to have a number of central frequencies as shown in FIGS. 2C and 2D and it is controlled so as to be held constant. The output optical pulse obtained from either one of the optical paths 7 and 7' is spatially separated into parallel beams by prisms 61 and 62. Thereafter, an absorption light modulator 63 is placed on optical paths of the parallel beams. A one-dimensionally space-dependent light modulator using a liquid crystal, which will be described later as a specific example, was used as the light modulator 63. The light modulator 63 is supplied with a signal S to control the turning on and off of frequencies corresponding to respective locations or places for the light modulator 63. After the parallel beams are gathered again by prisms 64 and 65, they are allowed to pass through an optical transfer medium 19. Here, lenses may be used in place of the prisms 62 and 64. After the respective wavelengths are spatially separated by a prism 66, the transmitted signal is detected by a position-dependent one-dimensional photo-detector 67. Namely, position information about the turning on and off of the optical pulses at the optical modulator 63 can be transmitted to the photo-detector 67.

The present embodiment has described the case in which either one of the optical paths 7 and 7' is used. However, if similar devices are provided for the output optical pulses obtained from the respective optical paths, then the signal can be transmitted twice. Since the signal can be separated on the receiving side every wavelengths in this case, the transmission itself may be integrated into one transmission path. Namely, according to the present embodiment, the electric signal for controlling the light modulator 63 is converted into the on/of for light intensity to thereby make it possible to transmit a signal in wavelength multiple form.

[EMBODIMENT IV]

In the present embodiment, a phase-locked interferometer will be explained, which makes use of both the aforementioned optical paths 7 and 7' and mounts them on a semiconductor substrate. FIG. 5 is a block diagram showing a basic configuration of the phase-locked interferometer and draws even signal waveforms at respective input/output positions side by side together with the configuration of the phase-locked interferometer. Reference numeral 100 indicates a Mach-Zehnder interferometer of two optical paths, into which an optical pulse 3 having the continues spectrum and time characteristics shown in FIGS. 1B and 1C is launched. The output of the interferometer 100 is divided into two whose respective spectra result in discrete spectra like $\lambda_1$ and $\lambda_2$. Now consider that the respective peaks of the spectrum $\lambda_1$ fall within frequencies $f_1$, $f_3$, $f_5$, . . . , respectively whereas the respective peaks of the spectrum $\lambda_2$ fall within frequencies $f_2$, $f_4$, $f_6$, . . . , respectively. Reference numerals 200 and 300 indicate multichannel modulators into which optical pulses having spectra $\lambda_1$ and $\lambda_2$ are launched, respectively. Each channel of the multichannel modulator 200 and 300 corresponds to the modulation channel of a specific frequency. The multichannel modulators 200 and 300 are respectively supplied with modulating signals $S_1$ and $S_2$ and modulate the input optical pulses in response to these signals. As a result, the modulated optical pulses result in optical signals having spectra designated at numerals 201 and 301 respectively. Reference numeral 400 indicates an optical coupler which makes use of a half mirror, for example. The coupler 400 re-synthesizes the optical signals having the spectra 201 and 301 and produces the final output 401 therefrom. The optical spectrum of the final output 401 lacks partly, as shown in the drawing, in association with the modulating signals $S_1$ and $S_2$. output pulse waveform 402 indicating time characteristic greatly varies from the original input pulse waveform 3. An arbitrary pulse waveform is generated according to the modulating signals inputted to the multichannel modulators 200 and 300. The final output 401 results from the synthesis of the optical pulses having the spectra 201 and 301. Either of the two outputs from the optical coupler 400 may be used.

Figure 6A:
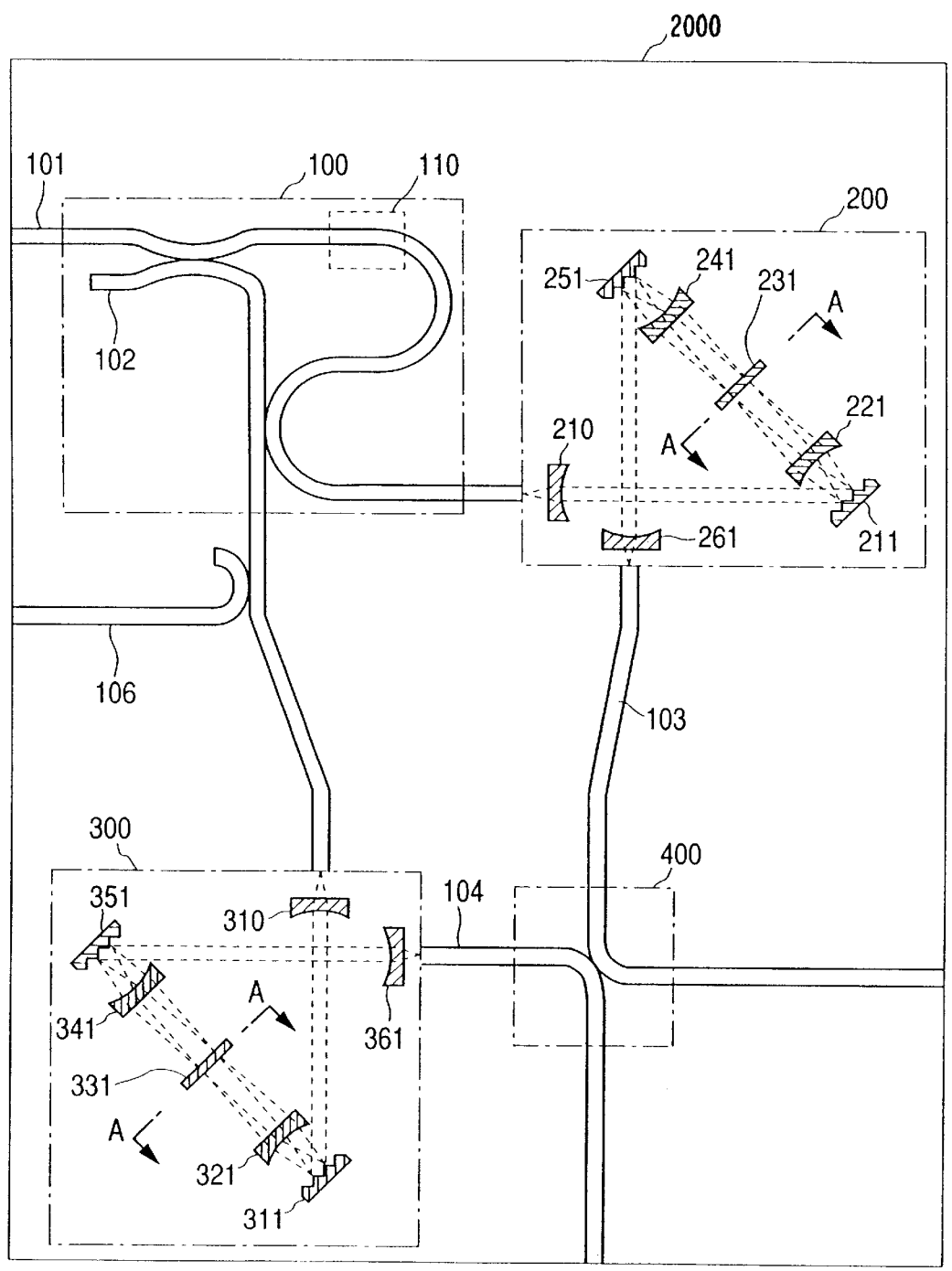
FIGS. 6A and 6B are respectively plan and side views showing a block diagram of an embodiment in which the signal synthesizer shown in FIG. 5 is formed on a semiconductor substrate.
Figure 6B:
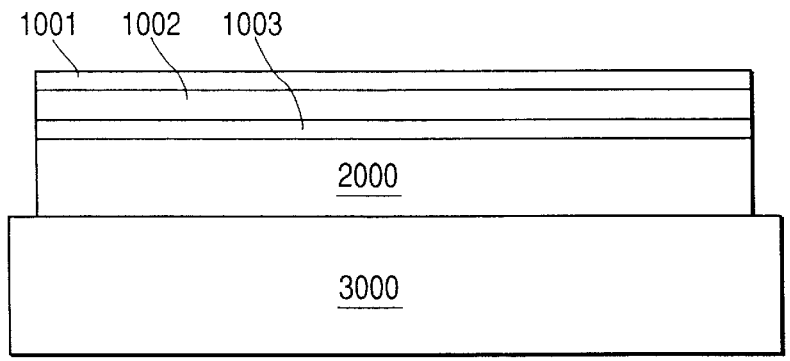

FIGS. 6A and 6B show a specific embodiment mounted on a semiconductor substrate. The present embodiment shows a signal synthesizer implemented by optical transparent triple layers provided on the semiconductor substrate. Reference numeral 2000 indicates a semiconductor substrate. Transparent triple layers 1003, 1002 and 1001 are stacked on the semiconductor substrate 2000. Refractive indexes of these triple layers are respectively defined as $n_3$, $n_2$ and $n_1$ for the layer 1003 on the substrate side, the layer 1002 formed as the intermediate layer and the layer 1001 formed as the outermost layer where $n_1<n_2$ and $n_3<n_2$ are satisfied. Light to be introduced from the outside is focused into the intermediate layer 1002 and allowed to propagate with the light trapped in this layer. The triple layers used herein can be formed as a polymer film, for example, and in addition, it may be formed by a semiconductor layer. An example, in which an optical element is constructed of such triple layers, has been introduced in FIG. 9 entitled "Optical Micromachine" in OYOBUTURI (The Japan Society of Applied Physics), Vol. 66, No. 1, pp. 9–14. Reference numeral 3000 indicates a constant temperature device. The semiconductor substrate 2000 is placed on the constant temperature device 3000. Namely, the signal synthesizer mounted on the upper surface of the semiconductor substrate 2000 is maintained at a constant temperature in the present embodiment.

Figure 7A:
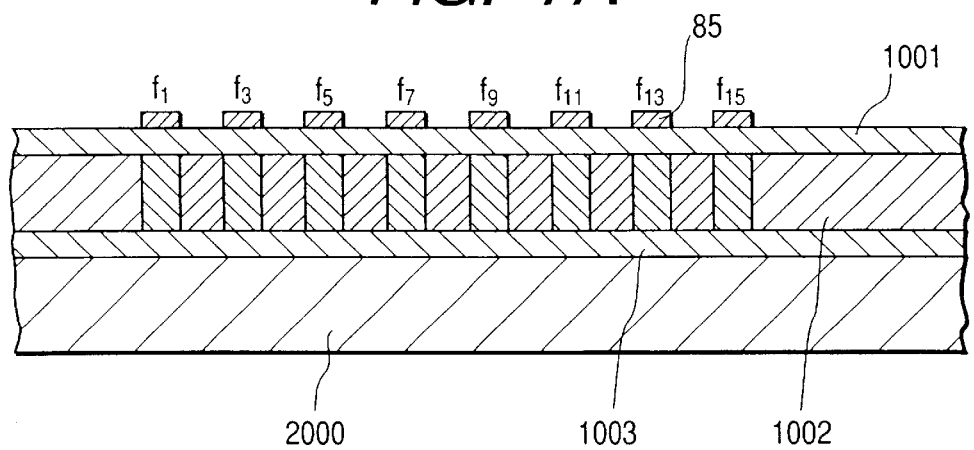
FIGS. 7A and 7B are respectively cross-sectional views depicting examples of spatial light modulators applied to the signal synthesizer shown in FIG. 6.
Figure 7B:
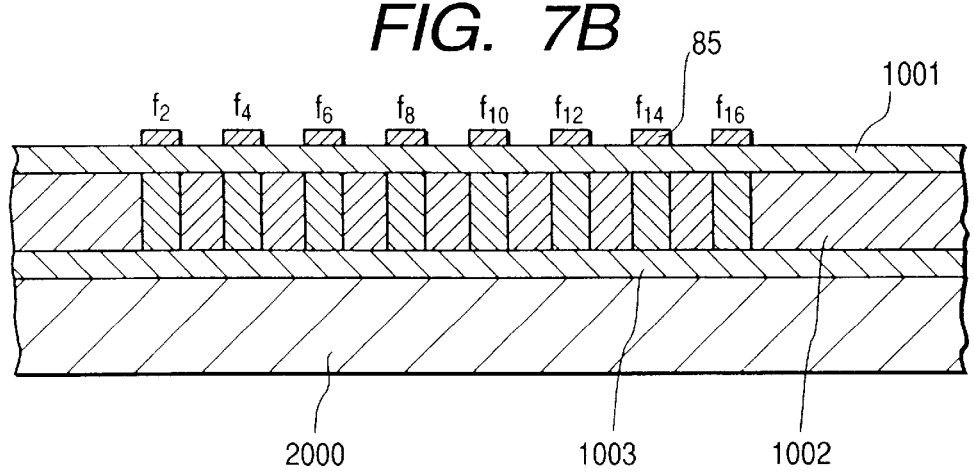

The incident light or optical pulse having the spectrum shown in FIG. 1B is introduced into a waveguide 101 formed by the transparent triple layers 1001, 1002 and 1003. The part except waveguide structure has no triple layers. The incident light is introduced into an optical path constituting the interferometer 100 through the waveguide 101. Since the other waveguide 102.contacts the waveguide 101 so as to form a separation path in the interferometer 100, the incident light is divided into two optical-paths corresponding to the waveguides 101 and 102. These two optical-paths are brought into contact with each other again at positions where their optical path lengths differ from each other. As a result, interference occurs in the above-described incident light and hence waveforms of spectra $\lambda_1$ and $\lambda_2$ shown in FIG. 5 are obtained from exits of the optical paths 101 and 102. The peak-to-peak frequency-difference of each waveform can be determined depending on the adjustment of each optical path length as described above. If further required, then a refractive index controller designated at numeral 110 is inserted into the optical path 101. The refractive index controller 110 can fine-adjust equivalently the substantial length of the optical path 101. The refractive index controller 110 is controlled by the voltage applied to each electrode provided at an upper portion of the optical path 101 to thereby control the refractive index. If required to stable the interferometer 100 in an analogy of FIG. 1A, then an optical path 106 is used as a monitor, corresponding to the optical path 7'. The compensation signal 11, in this case, is acted to the refractive index controller 110 or the temperature controller. The light emitted from the optical path 101 and the light emitted from the optical path 102 are introduced into the multichannel modulators 200 and 300, respectively. In the multichannel modulators 200 and 300, regions indicated by dashed lines in the drawing are all built of triply piled-up layers. Further, the multichannel modulators 200 and 300 are substantially identical in configuration to each other. The light or optical pulses launched from the optical paths 101 and 102 to the multichannel modulators 200 and 300 are set to parallel light beams by cut-away portions 210 and 310 having plano-concave shapes acting plano-convex lenses, respectively. The parallel light beams transmitted through the cut-away portions 210 and 310 are respectively introduced to cut-away portions 211 and 311 serving as diffraction gratings. The light or optical pulses separated into every frequency by the diffraction gratings 211 and 311 are focused on the spatial light modulators 231 and 331 every frequency through cut-away portions 221 an 321 acting plano-convex lenses. As described in FIGS. 7A and 7B showing portions of the spatial light modulators 231 and 331 in the form of cross sections, the spatial light modulators 231 and 331 allow the light or optical pulses subjected to optical modulation every frequency to pass therethrough because voltages for varying absorptance or refractive index are respectively applied to focusing positions associated with each frequency. The optical pulses transmitted through the spatial light modulators 231 and 331 are respectively introduced to cut-away portions 251 and 351 used to serve as diffraction gratings through cut-away portions 241 and 341 functioning as plano-convex lenses, where they are restored to the parallel light beams. The optical pulses restored to the parallel light beams are focused on their corresponding optical paths 103 and 104 through cut-away portions 261 and 361 acting plano-convex lenses. The optical pulses introduced into the optical paths 103 and 104 are coupled by the optical coupler 400 so that a signal waveform like the spectrum 401 shown in FIG. 5 is obtained.

FIGS. 7A and 7B are respectively cross-sectional views of the portions of the spatial light modulators 231 and 331 as viewed at positions taken along lines A—A in FIG. 6A. Reference numeral 2000 indicates a semiconductor substrate. Reference numerals 1003, 1002 and 1001 respectively indicate transparent layers stacked in three layers. Their refractive indexes are defined as $n_3$, $n_2$ and $n_1$ (where $n_1 < n_2$ and $n_3 < n_2$.

Reference numerals 85 respectively indicate electrodes which are provided on the transparent layer 1001 corresponding to the uppermost layer, where the electrode 85 and the substrate 2000 are electrically insulated. The light transmitted through the spatial light modulator 231 has only frequency components of $f=f_1$, $f_3$, $f_5$, as in the spectrum $\lambda_1$. The positions of the electrodes, which are necessary for modulation, are represented as shown in FIG. 7A. Similarly, the light transmitted through the spatial light modulator 331 has only frequency components of $f=f_2$, $f_4$, $f_6$, . . . as in the case of the spectrum $\lambda_2$. The positions of the electrodes, which are necessary for modulation, are represented as shown in FIG. 7B. In FIGS. 7A and 7B, different hatchings are provided in alternate order to clearly express the frequencies of the light transmitted through the intermediate transparent layer 1002. If the voltages applied (applied between the electrodes 85 and the semiconductor substrate 2000) to the electrodes 85 of the spatial light modulators 231 and 331 are controlled according to the modulating signals $S_1$ and $S_2$, then arbitrary modulation can be done.

In the embodiment shown in FIG. 6A, the all transparent layers can be cut out in plano-concave shapes form to form the plano-convex lenses and their stepwise cutting can form the diffraction gratings. Therefore, the whole can be configured on the semiconductor substrate.

In the present embodiment, the temperature control of the semiconductor substrate with high accuracy allows the implementation of a controlled stable interferometer. Thus, according to the present embodiment, the control system (for monitoring the fluctuations of the optical path difference of the interferometer according to the output optical pulse and thereby performing feedback on the optical path difference in the interferometer) described in FIG. 1A may be omitted. Of course, feedback, compensating the fluctuations of the optical path difference and controlling the voltage applied to the refractive index controller 110 shown in FIG. 6A, can be also made as well as the strict temperature-control of the semiconductor substrate.

Figure 8:
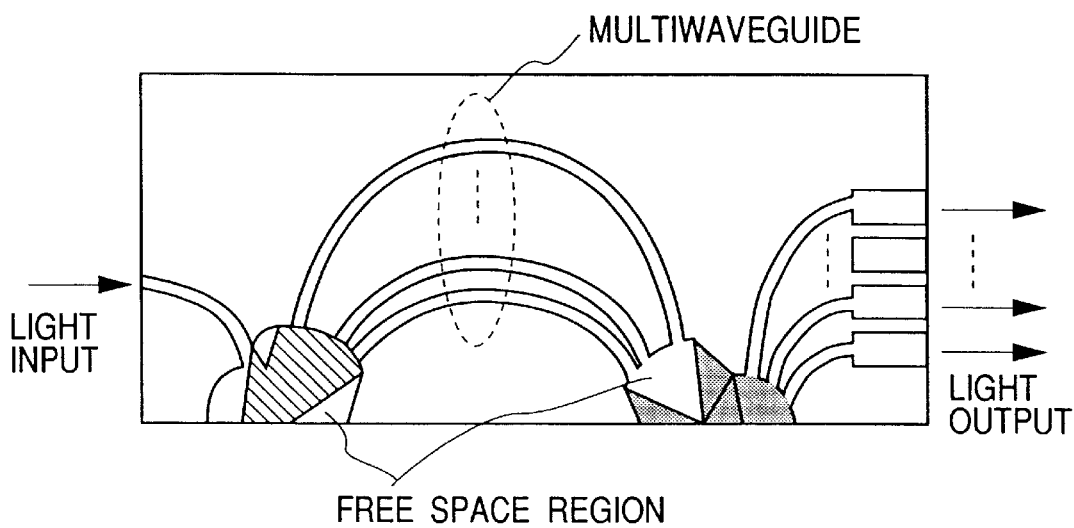
FIG. 8 is a diagram showing a modification of a part of the configuration of the signal synthesizer shown in FIG. 6.

A spectroscopic function, comprised of the cut-away portions 210 and 310 serving as the plano-convex lenses, the cut-away portions 211 and 311 serving as the diffraction gratings and the cut-away portions 221 and 321 serving as the plano-convex lenses employed in the embodiment shown in FIG. 6A, can be also performed using a waveguide grating shown in FIG. 8. The waveguide grating is disclosed in FIG. 2 of the paper "Multifrequency Laser for Dense WDM Applications" introduced in the European Conference on Integrated Optics'97 subsequent to the filing of the present application. Light is incident or inputted from the left end in the drawing and is transmitted successively through a free space region, a waveguide, and another free space region. Then light is introduced to each waveguide associated with each frequency, and finally amplified through an embedded layer. It can be easily understood that if this is utilized in reverse, then a light-gathering function, comprised of the cut-away portions 241 and 341 serving as the plano-convex lenses, the cut-away portions 251 and 351 serving as the diffraction gratings, and the cut-away portions 261 and 361 serving as the plano-convex lenses, can be achieved in the same manner as described above.

Figure 9:
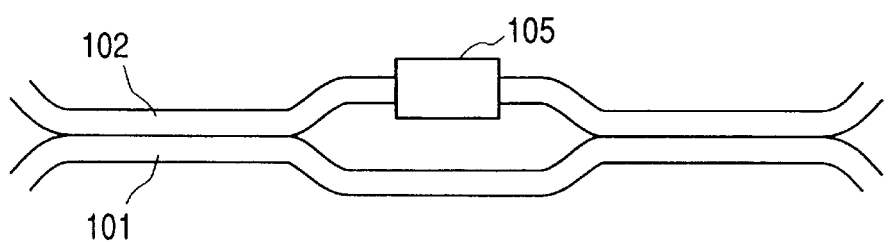
FIG. 9 is a diagram illustrating an embodiment of another configuration of a two optical-path interferometer.

FIG. 9 is a diagram showing an embodiment of another configuration of the two optical-path interferometer. The present embodiment is different from the embodiment of the interferometer 100 shown in FIG. 6A, because the length of two optical-paths are substantially formed equally, and the refractive index of one of those two optical-paths 1 is changed so that the optical paths are equivalently different in length from each other. In the drawing, reference numerals 101 and 102 respectively indicate optical paths similar to those illustrated in the embodiment of FIG. 6A. Reference numeral 105 indicates an electrode. The refractive index can be controlled by controlling the voltage (applied between the electrode 105 and the semiconductor substrate 2000) applied to the electrode 105. As a result, the optical path lengths can be equivalently rendered different from each other even if the optical paths are structurally identical in length to each other. The present embodiment has the merit of being capable of accommodating fluctuations in manufacture by control.

According to the present invention, a stable interferometer can be obtained in a resolution of 1/20 or less of the central wavelength of an input optical pulse. Further, the interferometer of the present invention can control the spectra of output pulses obtained when femtosecond pulses are inputted.

Further, since the output of the interferometer can be brought to discrete spectrums, light can be adjusted so as not to exist in a light-unmodulable region on a spatial light modulator. If both optical paths of the interferometer are used for signal synthesis, then optical synthesizing can be totally effected on a continuous spectrum over the entire range of the spectrum.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An optical signal synthesizer comprising:

an optical slab waveguide constructed from three layers in which optical pulses are introduced;

a first cut-away portion of said optical slab waveguide having a plano-concave shape serving as a plano-convex-lens which collimates the introduced optical pulses;

a second cut-away portion of said optical slab waveguide serving as a diffraction grating for parallel light beams in which the optical pulses are separated into every frequency;

a third cut-away portion of said optical slab waveguide having a plano-concave shape serving as plano-convex lens by which the separated optical pulses are focused on a different spatial position associated with each frequency;

a spatial light modulator fabricated at the focusing position in said optical slab waveguide which enables the optical pulses subjected to optical modulation every frequency to pass therethrough according to an applied electrical signal;

a fourth cut-away portion of said optical slab waveguide having a plano-concave shape serving as a plano-convex lens which collimates each modulated optical frequency component individually; and a fifth cut-away portion of said optical slab waveguide serving as a diffraction grating for the modulated optical pulses which restores the modulated optical pulses to the parallel light beams.

2. An optical signal synthesizer according to claim 1, wherein said three layers of said optical slab waveguide are stacked three transparent layers having respective refractive indexes defined as $n_1$, $n_2$ and $n_3$, where $n_1<n_2$ and $n_3<n_2$.

3. An optical signal synthesizer according to claim 2, wherein said optical slab waveguide is formed on a semiconductor substrate.

4. An optical signal synthesizer according to claim 3, wherein said semiconductor substrate is formed on a constant temperature device.

5. An optical signal synthesizer according to claim 2, wherein said spatial light modulator has electrodes on an uppermost layer of said stacked three transparent layers, each electrode of which is given an electric signal and by which the optical pulses are subjected to optical modulation every frequency to pass therethrough according to an applied electrical signal.

* * * * *